United States Patent
Urmanov et al.

(10) Patent No.: US 10,721,256 B2
(45) Date of Patent: Jul. 21, 2020

(54) ANOMALY DETECTION BASED ON EVENTS COMPOSED THROUGH UNSUPERVISED CLUSTERING OF LOG MESSAGES

(71) Applicant: Oracle International Corporation, Redwood Shores, CA (US)

(72) Inventors: Aleksey M. Urmanov, San Diego, CA (US); Alan Paul Wood, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 301 days.

(21) Appl. No.: 15/985,253

(22) Filed: May 21, 2018

(65) Prior Publication Data

US 2019/0354457 A1   Nov. 21, 2019

(51) Int. Cl.
| | |
|---|---|
| *H04L 29/06* | (2006.01) |
| *G06F 11/30* | (2006.01) |
| *G06F 11/07* | (2006.01) |
| *G06F 21/60* | (2013.01) |
| *G06F 11/34* | (2006.01) |
| *G06F 16/35* | (2019.01) |
| *G06F 21/55* | (2013.01) |

(52) U.S. Cl.
CPC ...... *H04L 63/1425* (2013.01); *G06F 11/0793* (2013.01); *G06F 11/3072* (2013.01); *G06F 11/3476* (2013.01); *G06F 16/353* (2019.01); *G06F 21/554* (2013.01); *G06F 21/604* (2013.01); *H04L 63/1416* (2013.01)

(58) Field of Classification Search
CPC ................................................... G06F 21/554
See application file for complete search history.

(56) References Cited

U.S. PATENT DOCUMENTS

| | | | |
|---|---|---|---|
| 5,040,133 | A | 8/1991 | Feintuch et al. |
| 5,987,399 | A | 11/1999 | Wegerich et al. |
| 6,049,797 | A | 4/2000 | Guha et al. |
| 6,092,072 | A | 7/2000 | Guha et al. |
| 6,208,997 | B1 | 3/2001 | Sigeti et al. |

(Continued)

FOREIGN PATENT DOCUMENTS

| | | |
|---|---|---|
| WO | 9957686 | 11/1999 |

OTHER PUBLICATIONS

U.S. Appl. No. 13/969,771, filed Aug. 19, 2013, and office actions from various dates.

(Continued)

*Primary Examiner* — Dao Q Ho (74) *Attorney, Agent, or Firm* — Park, Vaughan, Fleming & Dowler LLP (57) ABSTRACT

The disclosed embodiments provide a system that detects an anomaly in a computer system based on log messages. During operation, the system receives log messages generated by the computer system during operation of the computer system. Next, the system maps each received log message to a cluster in a set of clusters of log messages, wherein each cluster is associated with a specific event. The system then forms events for consecutive log messages into sequences of events. Finally, the system performs anomaly detection based on the sequences of events, wherein if an anomaly is detected, the system triggers an alert.

16 Claims, 4 Drawing Sheets

(56) References Cited

U.S. PATENT DOCUMENTS

| | | | |
|---|---|---|---|
| 6,882,998 | B1 | 4/2005 | Stemp |
| 7,660,775 | B2 | 2/2010 | Bougaev et al. |
| 7,739,143 | B1 | 6/2010 | Dwarakanath et al. |
| 7,739,284 | B2 | 6/2010 | Aggarwal et al. |
| 7,761,350 | B1 | 7/2010 | Ridgeway |
| 7,783,510 | B1 | 8/2010 | Gilgur et al. |
| 7,987,106 | B1 | 7/2011 | Aykin |
| 8,200,454 | B2 | 6/2012 | Dorneich et al. |
| 8,229,876 | B2 | 7/2012 | Roychowdhury |
| 8,234,236 | B2 | 7/2012 | Beaty et al. |
| 8,363,961 | B1 | 1/2013 | Avidan et al. |
| 8,576,964 | B2 | 11/2013 | Taniguchi et al. |
| 8,583,649 | B2 | 11/2013 | Ailon et al. |
| 8,635,328 | B2 | 1/2014 | Corley et al. |
| 8,694,969 | B2 | 4/2014 | Bernardini et al. |
| 8,880,525 | B2 | 11/2014 | Galle et al. |
| 9,053,171 | B2 | 6/2015 | Ailon et al. |
| 9,147,167 | B2 | 9/2015 | Urmanov et al. |
| 9,330,119 | B2 | 5/2016 | Chan et al. |
| 9,355,357 | B2 | 5/2016 | Hao et al. |
| 9,495,395 | B2 | 11/2016 | Chan et al. |
| 9,514,213 | B2 | 12/2016 | Wood et al. |
| 9,692,662 | B2 | 6/2017 | Chan et al. |
| 9,710,493 | B2 | 7/2017 | Wang et al. |
| 2002/0099675 | A1 | 7/2002 | Agrafiotis et al. |
| 2002/0147703 | A1 | 10/2002 | Yu et al. |
| 2003/0224344 | A1 | 12/2003 | Shamir et al. |
| 2006/0161592 | A1 | 7/2006 | Ertoz et al. |
| 2008/0010304 | A1 | 1/2008 | Vempala et al. |
| 2008/0181503 | A1 | 7/2008 | Schclar et al. |
| 2008/0275862 | A1 | 11/2008 | Liu et al. |
| 2010/0027552 | A1 | 2/2010 | Hill |
| 2010/0067745 | A1 | 3/2010 | Kovtun et al. |
| 2011/0040575 | A1 | 2/2011 | Wright et al. |
| 2011/0071624 | A1 | 3/2011 | Finch et al. |
| 2011/0105885 | A1 | 5/2011 | Liew et al. |
| 2011/0125894 | A1 | 5/2011 | Anderson et al. |
| 2011/0126197 | A1 | 5/2011 | Larsen et al. |
| 2011/0126275 | A1 | 5/2011 | Anderson et al. |
| 2012/0054184 | A1 | 3/2012 | Masud et al. |
| 2012/0173547 | A1 | 7/2012 | Suntinger et al. |
| 2012/0254183 | A1 | 10/2012 | Ailon et al. |
| 2013/0016584 | A1 | 1/2013 | Zhou et al. |
| 2013/0271463 | A1 | 10/2013 | Curington et al. |
| 2013/0326202 | A1 | 12/2013 | Rosenthal et al. |
| 2014/0006403 | A1 | 1/2014 | King et al. |
| 2014/0067757 | A1 | 3/2014 | Ailon et al. |
| 2014/0143182 | A1 | 5/2014 | Urmanov et al. |
| 2014/0280146 | A1 | 9/2014 | Wood et al. |
| 2014/0379717 | A1 | 12/2014 | Urmanov et al. |
| 2015/0248446 | A1 | 9/2015 | Nordstrom et al. |
| 2016/0283533 | A1* | 9/2016 | Urmanov .............. G06F 16/285 |
| 2016/0299961 | A1 | 10/2016 | Olsen |
| 2017/0155672 | A1* | 6/2017 | Muthukrishnan ....... H04L 67/02 |

OTHER PUBLICATIONS

U.S. Appl. No. 14/251,867, filed Apr. 14, 2014, and office actions from various dates.

U.S. Appl. No. 14/669,729, filed Mar. 26, 2015, and office actions from various dates.

U.S. Appl. No. 14/669,792, filed Mar. 26, 2015, and office actions from various dates.

Banfield et al.; "Model-Based Gaussian and Non-Gaussian Clustering", Biometrics, vol. 49, No. 3 (Sep. 1993), pp. 803-821, Published by: International Biometric Society.

Choi et al.; "A Survey of Binary Similarity and Distance Measures", Systemics, Cybernetics and Informatics, vol. 8—No. 1, year 2010.

Davies et al.; "A Cluster Separation Measure", IEEE Transactions on Pattern Analysis and Machine Intelligence, vol. PAMI-1, No. 2, Apr. 1979, pp. 224-227.

Ding et al.; "A MinMaxCut Spectral Method for Data Clustering and Graph Partitioning", LBNL Tech Report #54111, Dec. 1, 2003.

Erten et al.; "Triangulations with Locally Optimal Steiner Points", Eurographics Symposium on Geometry Processing (2007)_, pp. 1-10.

Fabris et al.; "A Multi-Measure Nearest Neighbor Algorithm for Time Series Classification", Advances in Artificial Intelligence—IBERAMIA 2008, Lecture Notes in Computer Science—vol. 5290, 2008; pp. 1-7.

Han et al.; "Data Mining: Concepts and Techniques", University of Illinois at Urbana-Champaign, 2006, Morgan Kaufmann Publishers, pp. 1-28, San Francisco, CA.

Haugen et al.; "Extracting Common Time Trends from Concurrent Time Series: Maximum Autocorrelation Factors with Applications", Stanford University, Oct. 20, 2015, pp. 1-38.

Heinrich et al.; "Multi-distance motion vector clustering algorithm for video-based sleep analysis", 2013 IEEE 15th International Conference on e-Health Networking, Applications and Services (Healthcom 2013).

Hodge et al.; "A Survey of Outlier Detection Methodologies", Artificial Intelligence Review 22, 2004, pp. 85-126, Kluwer Academic Publishers, Printed in the Netherlands.

Hu et al.; "Pairwise Constrained Clustering with Group Similarity-Based Patterns", 2010 Ninth International Conference on Machine Learning and Applications, pp. 260-265.

Jarvis et al.; "Clustering Using a Similarity Measure Based on Shared Near Neighbors", IEEE Transactions on Computers, vol. C-22, No. 11, Nov. 1973.

Johnson; "Hierarchical Clustering Schemes", Psychometrika—vol. 32, No. 3, Sep. 1967.

Kohonen; "Self-Organized Formation of Topologically Correct Feature Maps", Biological Cybernetics 43, 59-69 (:1982).

Lewis et al.; Triangulation of planar regions with applications, 1976, The Computer Journal, pp. 324-332.

Luo et al.; "A Probabilistic Framework for Graph Clustering", IEEE pp. 1-912, 2001.

MacQueen; "Some Methods for Classification and Analysis of Multivariate Observations", University of California, Los Angeles, Proceedings of Fifth Berkeley Symposium on Mathematical Statistics and Probability, 1967, pp. 281-297 University of California, Los Angeles, CA.

Molodykh et al.; "Operating Model of Knowledge Quantum Engineering for Decision-Making in Conditions of Indeterminancy" International Journal "Information Theories & Applications", vol. 14 / 2007.

Parker et al.; "Supervised Risk Predictor of Brest Cancer Based on Intrinsic Subtypes", Journal of Clinical Oncology, vol. 27, No. 8, Mar. 10, 2009 by American Society of Clinical Oncology.

Pothen et al.; "Partitioning Sparse Matrices with Eigenvectors of Graphs", SIAM J. Matrix Anal. Appl. vol. 11, No. 3, pp. 430-452, Jul. 1990, Society for Industrial and Applied Mathematics.

Scholkopf et al.; "Support Vector Method for Novelty Detection", in NIPS, vol. 12, 1999, pp. 582-588.

Slipetskyy; "Security Issues in OpenStack", Master's Thesis, Technical University of Denmark, Jun. 2011.

Somlo et al; "Incremental Clustering for Profile Maintenance in Information Gathering Web Agents", Agents '01, Montreal, Quebec, Canada, May 28-Jun. 1, 2001, pp. 262-269.

Szmit et al.; "Usage of Modified Hold-Winters Method in the Anomaly Detection of Network Traffic: Case Studies", Hindawi Publishing Corporation, Journal of Computer Networks and Communications, vol. 2012, Article ID 192913, 5 pages, doi:10.1155/2012/192913, Mar. 29, 2012.

Trosset; "Representing Clusters: K-Means Clustering, Self-Organizing Maps, and Multidimensional Scaling", Apr. 6, 2006, pp. 1-17, Department of Mathematics, College of William and Mary.

Vlachos et al.; "A Multi-Metric Index for Euclidean and Periodic Matching", in Principles of Data Mining and Knowledge Discovery, 2005; pp. 355-366.

Voras et al.; "Criteria for Evaluation of Open Source Cloud Computing Solutions", Proceedings of the ITI 2011 33rd Int. Conf. on Information Technology Interfaces, Jun. 27-30, 2011, Cavtat Croatia.

(56) References Cited

OTHER PUBLICATIONS

Zhang et al.; "Real-time forecasting of online auctions via functional K-nearest neighbors", International Journal of Forecasting 26 (201) 666-683, ScienceDirect.
Zhou et al.; "Graph Clustering Based on Structural/Attribute Similarities", pp. 718-729 VLDB '09, Aug. 24-28, 2009, Lyon France.
Basu et al.; "Assisting Users with Clustering Tasks by Combining Metric Learning and Classification", Association for the Advancement of Artificial Intelligence (www.aaai.org) 2010.
Ester et al.; "A Density-Based Algorithm for Discovering Clusters in Large Spatial Databases with Noise", KDD-96 proceedings, 1996, AAAI (www.aaai.org).
Jaskowiak et al.; "On the selection of appropriate distances for gene expression data clustering", BMC Bioinformatics 2014, 15 (Suppl 2) S2 http://biomedcentral.com/1471-2105/15/S2/S2, The Twelfth Asia Pacific Bioinformatics Conferance (APBC) Shanghai, China Jan. 17-19, 2014.
Taylor et al; "Forecasting intraday time series with multiple seasonal cycles using parsimonious seasonal exponential smoothing", Omega 40 (2012) 748-757, www.elsevier.com/locate/omega, 2011 Elsevier Ltd.
Wikipedia; Iris Flower Data Set; downloaded Jan. 30, 2019, https://en.wikipedia.org/wiki/Iris_flower_data_set, pp. 1-5.

* cited by examiner

FIG. 5

ANOMALY DETECTION BASED ON EVENTS COMPOSED THROUGH UNSUPERVISED CLUSTERING OF LOG MESSAGES

BACKGROUND

Field

The disclosed embodiments generally relate to techniques for detecting anomalous events during operation of a computer system. More specifically, the disclosed embodiments relate to a technique for detecting anomalies in a computer system based on sequences of events, which are generated from log messages through unsupervised learning.

Related Art

In a computer data center, a variety of systems automatically produce log messages, which are stored in log files. These log messages can be used to detect specific events, or sequences of events, which may indicate that a system has failed or is likely to fail, or that some other type of anomaly, such as a security violation, has taken place. Events are presently generated from log messages using three different approaches. The first approach involves using log message parsers, which are manually configured for specific log messages. This is the most straightforward and most time-consuming approach. Unfortunately, because of the required manual configuration, this approach cannot be readily scaled to accommodate many different types of log messages, and is not automatically adaptable to changing systems and environments.

The second common approach is to use classification techniques similar to those used in natural language processing (NLP) applications. In this approach, starting with a training set, which is labeled by a human expert, the system trains a classifier using a parametric or nonparametric technique to correctly classify the items in the training set according to the assigned labels. The main disadvantage of this technique is the need for manually labeled messages, which makes this approach expensive and impractical for many applications.

The third (and the most widely used) approach makes use of unsupervised classification techniques to form the log messages into groups, and then associates an event with each group. A significant disadvantage of this approach is that the results of clustering are heavily dependent on the structure of log messages. For example, commonly used classification techniques, such as LogTree, LogSig and StringKernel, may produce dramatically different results because they use different information to cluster log messages: LogTree uses format and structural information of the logs; LogSig uses message signatures and incorporates domain expert knowledge; and StringKernel uses various kernels designed to measure similarity of strings.

Other clustering techniques, such as k-medoids and k-means, depend on initial random seeds, which significantly complicates the use of these techniques in many practical applications. The Jaccard and VectorModel techniques apply bag-of-words models, which ignore order in the messages and may prevent discrimination of messages with similar words. The Iterative Partitioning Log Mining (IPLoM) technique partitions messages in terms of counts, which requires user setup and wherein results depend on the specified terms.

The above-described approaches require a user to manually set different parameters, including specifying the number of clusters to use for a classifier, or additional heuristic criteria that enables the system to select an "optimal" number of clusters over multiple runs. Note that changes in the specified parameters may result in dramatically different clusters; this means the results produced through these approaches are unstable.

Hence, what is needed is a new technique for automatically forming arbitrary log messages into clusters associated with events, and then performing anomaly detection operations based on these events with minimal user involvement.

SUMMARY

The disclosed embodiments provide a system that detects an anomaly in a computer system based on log messages. During operation, the system receives log messages generated by the computer system during operation of the computer system. Next, the system maps each received log message to a cluster in a set of clusters of log messages, wherein each cluster is associated with a specific event. The system then forms events for consecutive log messages into sequences of events. Finally, the system performs anomaly detection based on the sequences of events, wherein if an anomaly is detected, the system triggers an alert.

In some embodiments, during a preceding log-cluster training process, which generates the set of clusters of log messages, the system: receives training log messages generated by the computer system during operation of the computer system in a training phase; performs a clustering operation on the training log messages to produce the set of clusters of log messages; and associates an event with each cluster in the set of clusters.

In some embodiments, the clustering operation involves using a clustering technique, which automatically determines a number of clusters in the set of clusters.

In some embodiments, the clustering operation is performed using the tri-point clustering (TPC) technique.

In some embodiments, while performing the clustering operation, the system associates one or more templates with each cluster, wherein each template includes a fixed portion, comprising common substrings for log messages that map to the template, and a variable portion, comprising one or more attribute values that have been replaced with wildcard values, wherein a log message is assigned to a cluster when the log message matches a template associated with the cluster.

In some embodiments, for each log message, the system replaces attribute values that contain personally identifiable information (PII) with wildcard values, thereby removing the PII from the log message.

In some embodiments, while performing the anomaly detection based on the sequences of events, the system converts the sequences of events into a set of associations feature vectors (AFVs), wherein each AFV represents correlations between events in a related set of contexts, wherein each context comprises a window of events. Next, the system maps each AFV to an AFV cluster in a set of AFV clusters, wherein an anomaly is detected whenever an AFV does not map to an AFV cluster in the set of AFV clusters.

In some embodiments, during a preceding AFV-cluster training process, which generates the set of AFV clusters, the system receives AFV-cluster training data comprising a sequence of events resulting from the log messages generated by the computer system during operation of the computer system in the training phase. Next, the system slides markers that define a window along a time axis in the sequence of events to produce a set of contexts, wherein each context comprises a window of consecutive events in the sequence of events. Then, for each event in the sequence of events, the system forms a context set comprising a current context, which is a first context that contains the event, and a preceding sequence of context sets. Next, the system forms an AFV for each context set, wherein each AFV represents correlations between events that comprise each context in the context set. Finally, the system performs a clustering operation on the AFVs to form the set of AFV clusters.

In some embodiments, while performing the clustering operation on the AFVs, the system uses the TPC technique to perform the clustering operation.

In some embodiments, a detected anomaly indicates one of the following: a hardware failure; a software failure; an intrusion detection; a malicious activity; or a performance issue.

BRIEF DESCRIPTION OF THE FIGURES

Table 1 illustrates a set of templates in accordance with the disclosed embodiments.

Table 2 illustrates another set of templates in accordance with the disclosed embodiments.

Table 3 illustrates an exemplary sequence of events in accordance with the disclosed embodiments.

Table 4 illustrates an exemplary set of event association rules (EARs) in accordance with the disclosed embodiments.

Table 5 illustrates an exemplary structure for an AFV in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Discussion

The disclosed embodiments relate a system, which automatically composes events from log messages, and then detects anomalies based on sequences of events. During operation, the system automatically classifies log messages into categories (clusters) of similar messages and represents them using templates with permanent and variable parts. The variable parts represent changing information in the messages, such as user names, IP addresses, numbers of bytes received, status of authentications, types of protocols, etc. Next, the system generates an event based on an incoming log message, and then analyzes the event in the context of prior events. During this process, the system uses the tri-point clustering technique to detect anomalous events based on the context of prior events.

Hence, the system provides the ability to detect anomalous behavior from unlabeled log data without any involvement of a domain expert, even when the log messages appear normal and have been repeatedly observed in the past. By analyzing messages generated by the system over time, the disclosed system builds comprehensive models of a system's behavior. Even if an adversary (such as an attacker or a bot) obtains knowledge about a user's IDs and passwords and is able to successfully access the user's resources, the adversary cannot replicate the user's behavior, which is captured by contextual associations. As a consequence, when the adversary's actions deviate from the user's expected behavior, an alert will be generated.

The system receives the log messages either in a streaming mode or as a batch file. In the case of streaming mode, the system first accumulates the initial portion of messages before commencing a clustering operation. (Note that the system suppresses anomaly alerts during the initial formation of clusters.) Each log message contains a timestamp, which is usually the first part of the message and is easily identifiable. After identifying the timestamp, the system separates the rest of the message from the timestamp, and maintains the timestamp information as an attribute of an event, which is composed from the rest of the message.

Next, the system passes the separated message body through a message clustering module (MCM), which determines if the message is similar to any members of the current clusters and also provides a cluster membership score (CMS) for each of the existing clusters. The CMS is always a positive number. A CMS less than 1.0 indicates that the message is similar to the members of the cluster and can be considered part of the cluster. In contrast, a CMS larger than 1.0 indicates that the message is not similar to the members of the cluster and cannot be considered part of the cluster. If the smallest CMS is greater than 1, then the message is not similar to any existing cluster, and the message is marked as anomalous with respect to the current cluster configuration.

A novel way of representing clusters, which is different from existing parametric and nonparametric clustering techniques, is to use deduplicated de-PII'd templates, wherein a "de-PII'd template" is a template for which all PII is removed. These templates represent classes of messages and facilitate compacted storage of the original message data, which is required for clustering. At the same time the stored data is completely depersonalized to address the PII challenges common in all machine-learning applications. Note that in traditional nonparametric clustering, in order to cluster a new message, the systems needs to store all of the original data that was used to build the clusters. This requires a large amount of storage, and will slow down the computation significantly to the point of becoming unfeasible for many applications. The disclosed embodiments avoid this problem by using deduplicated and de-PII'd templates of the original messages.

The CMS is computed in the following way. For each template that is part of a cluster C, the nearest neighbor is found. The smallest value of the similarity to the nearest neighbor among all the members of the cluster is used as a threshold for determining whether a test message is similar to the cluster. The CMS is computed as the ratio of the similarity of the test message to the nearest neighbor member of the cluster to the threshold value. If the test message is more similar to a member of a cluster than some nearest neighbors of some members of the cluster, then the test message is considered to be typical for the cluster, which means the ratio is smaller than one. On the other hand, if the test message's similarity with the closest neighbor from the cluster is smaller than the threshold, then the test message is not typical for the cluster. In this case, the CMS is greater than one. (The less similar the test message is to the cluster, the higher the CMS value.)

After the test message passes through the MCM, and its CMS is computed, the following actions can be taken, which depend on the value of the CMS. If the CMS is less than 1.0, the message is "assigned" to the cluster for which the message has the smallest CMS value. An event of the type corresponding to the assigned cluster is composed and attributed with the information extracted from the message body. The composed event is further transmitted for processing or archiving. If the CMS is larger than 1.0, then the message is labeled as "anomalous" with respect to the current clustering configuration and an alert is generated. This alert triggers the creation of a new cluster based on the anomalous message, and the anomalous message becomes the first template for members of the new cluster. The new cluster is then labeled as "new" and "unverified." While the new cluster remains unverified, any new message that falls into the new cluster also generates an alarm.

Note that each cluster is represented by a data structure that contains a list of templates with an occurrence count for each template. The templates are automatically generated from a set of original messages by identifying common substrings in the messages, wherein the identified common substrings become the template body. Note that the longest common substring (LCS) technique can be used to list the common substrings in a given set of messages.) The varying part comprises specific values of various attributes, and is replaced by a designated "wildcard" symbol such as an asterisk. For example, an exemplary cluster may contain the templates illustrated in Table 1 below, with the occurrence counts appearing in square brackets.

Another cluster may contain the templates that are illustrated in Table 2 below.

TABLE 1

[34] Group <*******> User <****> IP <*...> First * SVC connection estab
[12] Group <*******> User <*****> IP <*.*..> First * SVC connection estab
[1112] Group <*******> User <******> IP <*.*..> First * SVC connection estab
[2] Group <*******> User <> IP <*...> First * SVC connection estab
[13] Group <***********> User <*> IP <*...*> First * SVC connection estab
[32] Group <***********> User <**> IP <*...*> First * SVC connection estab
[11] Group <***********> User <********> IP <*.*..> First * SVC connection estab

TABLE 2

[43] AAA user accounting Successful : server = ..*.* : user = *********
[27] AAA user accounting Successful : server = ..*.* : user = **********
[7] AAA user accounting Successful : server = *.*.*.* : user = ******
[87] AAA user accounting Successful : server = *.*.*.* : user = ********
[23] AAA user accounting Successful : server = ...* : user = ********
[55] AAA user accounting Successful : server = .*.. : user = ***************

By generating templates in this way, the system generates the same similarity values when using the edit distance metric to compare a test string to the members of a cluster as would be obtained without using templates. (Note that the edit distance metric expresses the difference between two strings as the minimum number of edits necessary to convert one string into the other.)

Note that the edit distance metric can be modified to take advantage of the template structure. Specifically, if the test string matches the permanent part of a template and differs only in the variable parts, the edit distance metric considers the asterisk to match any character of the variable part. This way, values represented by substrings of the same length contribute zero to the overall edit distance between the test string and the template, which is a desirable property when matching a message to the templates of a cluster. We refer to the edit distance modified in this way as the "template edit distance."

After the system passes the message through the message clustering module, which composes a new event corresponding to one of the existing clusters or to a newly created cluster, the newly composed event is sent to the contextual anomaly detection module (CADM). The CADM analyzes an event in the context of other previous events and generates an alarm if the event is found to be anomalous in this context.

After the system generates an alarm for an anomalous event, the system may automatically performs a remedial action. This may involve, but is not limited to, one or more of the following: advising a system administrator about the anomalous event and the context; scheduling execution of diagnostics and/or security scanning applications on the affected parts of the monitored system; suspending affected users or services; enforcing multi-factor authentication for affected users or services; initiating service migration from affected parts of the system; taking other actions that facilitate reallocation and rebalancing affected resources and services; or modifying the settings of the firewalls (for example, by updating IP tables) to deny or throttle traffic to affected resources or services.

In some embodiments, the CADM makes use of event timing information. For example, if event E2 always follows event E1 within few seconds and the system observes E2 and does not observe E1, then E2 would be considered anomalous, although event E2 itself is not an anomaly as represented by a verified cluster in the MCM. The timing associations of events are converted into a numerical feature vector, which is tracked over time and whose different values represent different behavioral states of the monitored system. Changes in the feature vector represent changes of the system state, and previously unseen values indicate new, previously unseen, and possibly anomalous behavioral states of the monitored system.

A detailed description of the CADM follows. The CADM is synchronized with the MCM by receiving the types of events that are composed by the MCM. Let C denote the current configuration of the MCM. The configuration C comprises information about current events, wherein C={E1, E2, . . . , Ec}. As new, previously unseen, potentially anomalous, messages are received, the MCM creates new events and C is updated with a new event Ed, so the updated configuration becomes C={E1, E2, . . . , Ec, Ed}, which is communicated to the CADM.

See Table 3, which illustrates a technique for generating contexts from a current configuration.

TABLE 3

----E1-----E3-E5--------E2---E3-E5--E1----E2----Ec------E2-[--E3-E5
--------E4-----E5---]---->

The square brackets represent the context that contains the K=4 last events. In one variation, the inter-event time is also considered. For a given value of K, the context is an association rule having K domains denoted as <T1=Ei1: T2=Ei2: . . . :TK=EiK>. Sliding the square brackets along the time axis will generate event association rules (EARs) with K domains as is illustrated in Table 4, wherein: domain "T1=Ei" denotes the rightmost (most recent) event in the context; domain "T2=Ei" denotes the event that happened just before "T1"; and the "TK" domain denotes the leftmost (oldest) event in the sequence of events covered by the context.

TABLE 4

...
<T1 = E2 :T2 = Ec :T3 = E2 :T4 = E1>
<T1 = E3 :T2 = E2 :T3 = Ec :T4 = E2>
<T1 = E5 :T2 = E3 :T3 = E2 :T4 = Ec>
<T1 = E4 :T2 = E5 :T3 = E3 :T4 = E2>
<T1 = E5 :T2 = E4 :T3 = E5 :T4 = E3>

By sliding the brackets along the time axis, we produce a sequence of EARs, which are also referred to as "contexts." Fixing a time interval during which the system accumulates the EARs, or alternatively the number of the accumulated EARs, will result in a set of contexts representing sequences of events that happened between the present moment and the recent past.

Note that the recent past can be expressed in milliseconds or days depending on the characteristic time scale of the monitored system. If the monitored system emits messages indicating certain authentication actions of users to resources, and the number of users is in thousands, the appropriate time scale may be hours to days. In contrast, if the monitored system produces tens of thousands of messages per second representing the quickly changing state of network switches in a data center, the appropriate time scale may be milliseconds to seconds.

For a given context set, which comprises the set of EARs between the present moment and the recent past, the associations feature vector (AFV) is computed as is illustrated in Table 5, wherein each element represents associations between domains.

TABLE 5

AFV(t) = (
A(T1;T2),A(T1;T3),A(T1;T4),A(T2;T3),A(T2;T4),A(T3;T4), // 2-way assocs
A(T1;T2;T3),A(T1;T2;T4),A(T2;T3;T4), // 3-way assocs
A(T1,T2,T3,T4) // 4-way assocs
)

The association between T1 and T2 is computed using the EARs in the context set as A(T1; T2)=(number of unobserved unique combinations of events)/(total number of possible combinations). In one variation, the associations feature vector elements are computed using mutual information, or other statistical features derived from the observed event sequences and inter-event times.

A feature vector computed in this way represents intrinsic system behavior reflected in the tendency of certain events to arrive in certain orderings. If there is no tendency or preference in the order of events, there are no associations among the events. This means that given the most recent sequence of events, any next event is equally likely. On the other hand, if there are associations between events, or tendencies for some events to follow other events, then given a recent sequence of events, the system can tell with confidence that the next event of a certain type is more likely than events of other types.

The feature vector captures quantitative associations among events generated by the monitored system, and can be tracked and analyzed to identify anomalous events in a number of different ways. In some embodiments, the system uses the tri-point clustering technique to facilitate identifying anomalous events.

The tri-point clustering technique is based on a notion of arbiters that decide whether two points (vectors) are similar or not. An arbiter is either a point from the dataset to be clustered, or a point from outside of the dataset. A similarity called "tri-point similarity" is computed for two points p1 and p2 given an arbiter a, and represents the similarity of the two points from the point of view of the arbiter.

$$Sim(p1,p2|a)=\min\{d(p1,a),d(p2,a)\}-d(p1,p2)/\max\{\min\{d(p1,a),d(p2,a)\},d(p1,p2)\}$$

The interpretation of this definition is as follows. When the distance from the arbiter to either of the points is greater than the distance between the points, the similarity is positive, meaning that the points are similar for the arbiter. On the other hand, if the distance from either point is smaller than the distance between the points, then the similarity is negative, meaning that the points are not similar for the arbiter.

Taking more than one arbiter and averaging the similarity for all arbiters produces an aggregated similarity. In some embodiments, all points of the dataset are taken as arbiters and the aggregated similarity is computed as the simple average. The resulting tri-point similarity matrix is further partitioned to obtain clusters of similar data points.

The $(i, j)^{th}$ entry of the tri-point similarity matrix is the "tri-point similarity" of points pi and pj from the dataset. The tri-point similarity matrix is symmetric and its entries range from −1.0 (completely dissimilar) to 1.0 (completely similar). Note that the dataset can contain data of any type. As long as there exists a distance function that can be applied, the tri-point similarity can be computed in terms of the distance function.

One technique to partition the tri-point similarity matrix S into clusters is through repeated application of the spectral partitioning technique, which uses the second eigenvector of the Laplacian of the similarity matrix.

$$L=D-S$$

where D is the diagonal matrix called the "degree matrix" with diagonal entries containing the row sum of the entries of the similarity matrix. For the spectral partitioning technique to work, the negative entries of the similarity matrix are set to zero before the spectral partitioning technique is applied.

The repeated spectral partitioning is applied to the clusters until the new partitions of a cluster are similar. During a first iteration, the entire dataset is split into two clusters. Then, each cluster is itself split into two clusters by applying the same spectral partitioning techniques to each cluster. If the new partitions are similar, they are merged together. The splitting process stops when any further splitting produces similar partitions. This procedure automatically identifies the number of clusters, wherein each cluster contains similar points, and points from different clusters are dissimilar. Note that the tri-point clustering technique automatically performs clustering into the optimal number of clusters, and does not receive any user-specified parameters that can bias the resulting clusters. This unique property is useful for unsupervised anomaly detection applications.

The feature vectors produced by the system are then fed into the tri-point clustering module, which either assigns an existing cluster label to the feature vector, or alternatively assigns no label, which indicates that the feature vector does not fit any of the existing clusters and is considered an anomaly.

Log-Processing System

Figure 1:
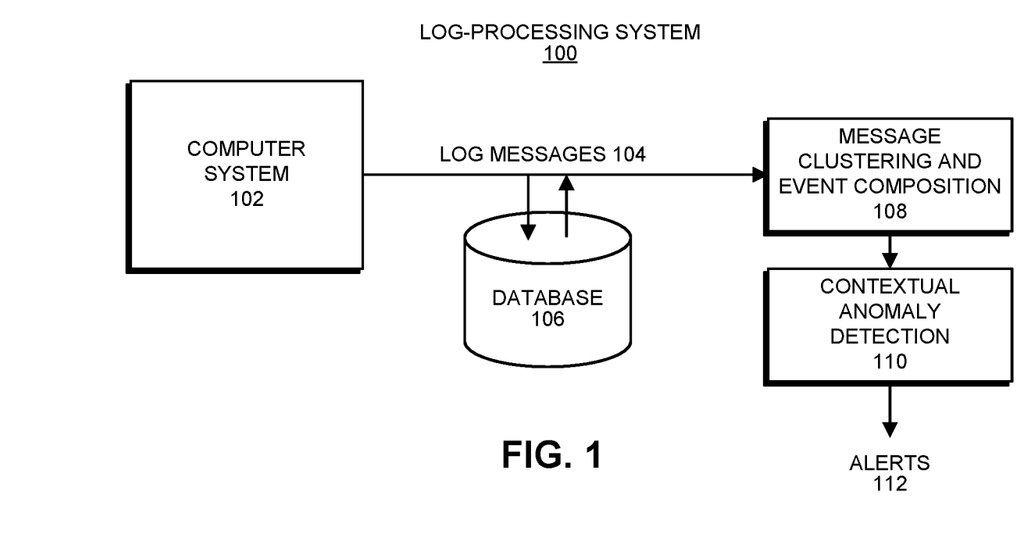
FIG. 1 illustrates a log-processing system in accordance with the disclosed embodiments.

FIG. 1 illustrates a log-processing system 100 in accordance with the disclosed embodiments. Log-processing system 100 operates on a stream of log messages 104, which are generated by a computer system 102. These log messages 104 relate to the operational status of hardware and software components within computer system 102. Log messages 104 can be stored in a database 106.

Next, log messages 104, which can originate directly from computer system 102 or from database 106, feed into a message clustering and event composition module 108, which forms log messages 104 into clusters, which are associated with events to form a sequence of events. This sequence of events feeds into a contextual anomaly detection module (CADM) 110, which detects anomalies based on the sequence of events. When anomalies are detected, CADM 110 generates alerts 112.

Process of Detecting an Anomaly Based on Log Messages

Figure 2:
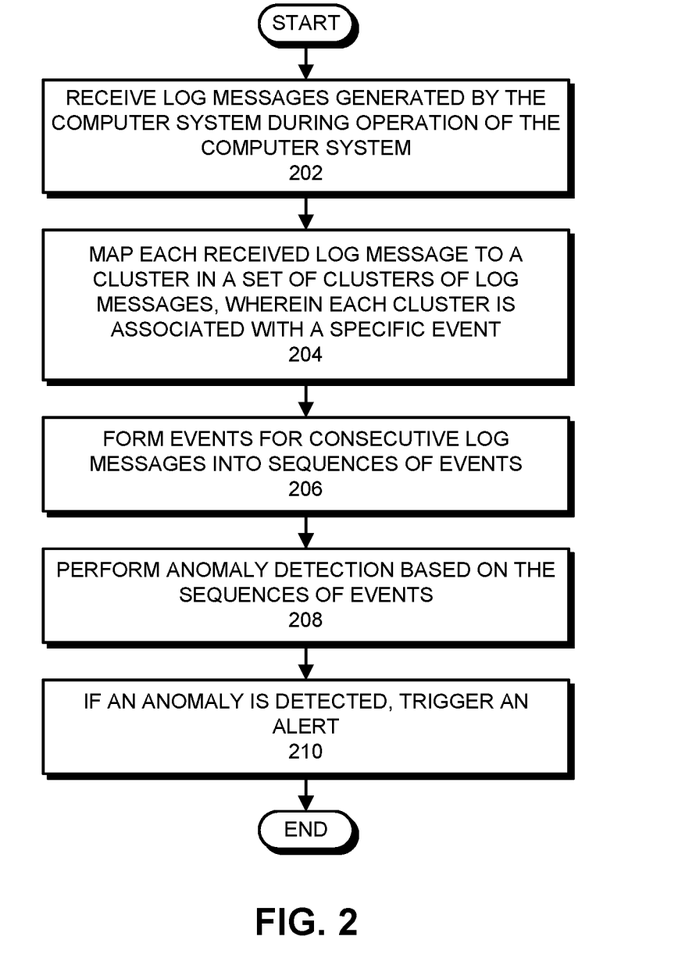
FIG. 2 presents a flow chart illustrating the process of detecting an anomaly in a computer system based on log messages in accordance with the disclosed embodiments.

FIG. 2 presents a flow chart illustrating the process of detecting an anomaly in a computer system based on log messages in accordance with the disclosed embodiments. During operation, the system receives log messages generated by the computer system during operation of the computer system (step 202). Next, the system maps each received log message to a cluster in a set of clusters of log messages, wherein each cluster is associated with a specific event (step 204). The system then forms events for consecutive log messages into sequences of events (step 206). Next, the system performs anomaly detection based on the sequences of events (step 208). Finally, if an anomaly is detected, the system triggers an alert (step 210).

Figure 3:
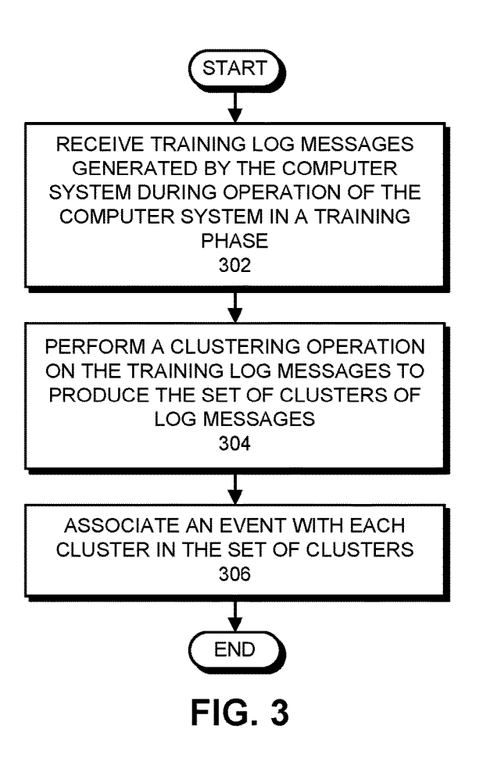
FIG. 3 presents a flow chart illustrating a training process, which generates clusters of log messages, in accordance with the disclosed embodiments.

FIG. 3 presents a flow chart illustrating a preceding log-cluster training process, which generates the set of clusters of log messages. During this log-cluster training process, the system receives training log messages generated by the computer system during operation of the computer system in a training phase (step 302). Next, the system performs a clustering operation on the training log messages to produce the set of clusters of log messages (step 304). The system then associates an event with each cluster in the set of clusters (step 306).

Figure 4:
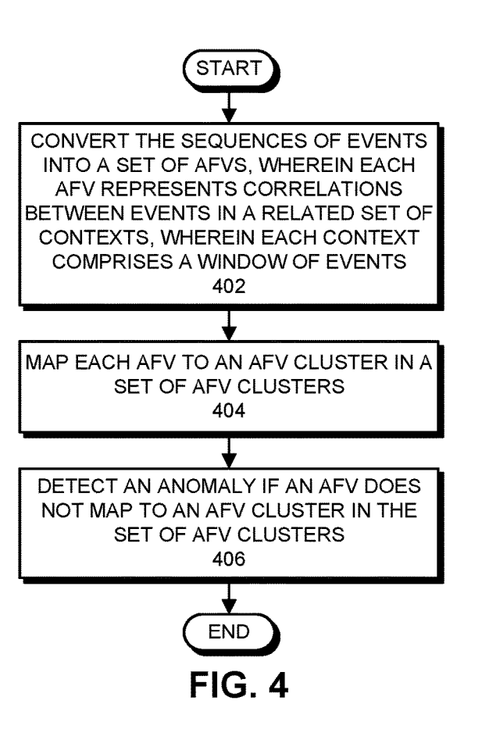
FIG. 4 presents a flow chart illustrating the process of performing the anomaly detection based on the sequences of events in accordance with the disclosed embodiments.

FIG. 4 presents a flow chart illustrating the process of performing the anomaly detection based on the sequences of events in accordance with the disclosed embodiments. First, the system converts the sequences of events into a set of associations feature vectors (AFVs), wherein each AFV represents correlations between events in a related set of contexts, wherein each context comprises a window of events (step 402). Next, the system maps each AFV to an AFV cluster in a set of AFV clusters (step 404). Finally, the system detects an anomaly if an AFV does not map to an AFV cluster in the set of AFV clusters (step 406).

Figure 5:
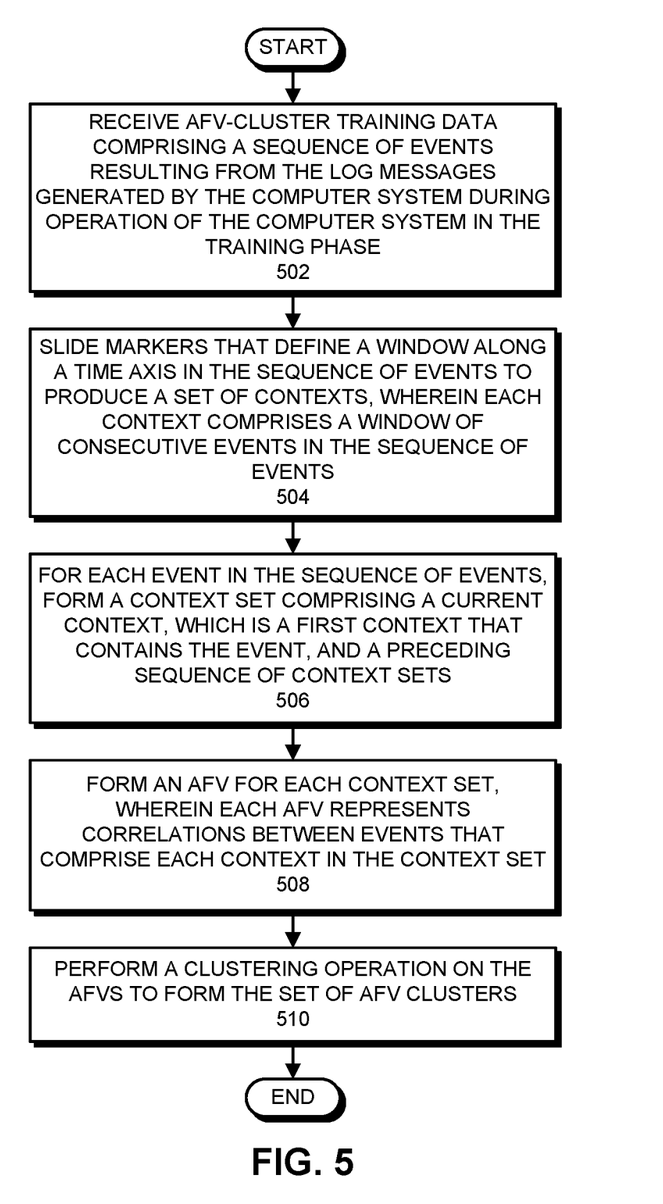
FIG. 5 presents a flow chart illustrating a preceding training process for associations feature vector (AFV) clusters in accordance with the disclosed embodiments.

FIG. 5 presents a flow chart illustrating a preceding AFV-cluster training process in accordance with the disclosed embodiments. During this process, the system first receives AFV-cluster training data comprising a sequence of events resulting from the log messages generated by the computer system during operation of the computer system in the training phase (step 502). Next, the system slides markers that define a window along a time axis in the sequence of events to produce a set of contexts, wherein each context comprises a window of consecutive events in the sequence of events (step 504). Then, for each event in the sequence of events, the system forms a context set comprising a current context, which is a first context that contains the event, and a preceding sequence of context sets (step 506). Next, the system forms an AFV for each context set, wherein each AFV represents correlations between events that comprise each context in the context set (step 508). Finally, the system performs a clustering operation on the AFVs to form the set of AFV clusters (step 510).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting an anomaly in a computer system based on log messages, comprising:
  receiving log messages generated by the computer system during operation of the computer system;
  mapping each received log message to a cluster in a set of clusters of log messages, wherein each cluster is associated with a specific event;
  forming events for consecutive log messages into sequences of events;
  preceding associations feature vector (AFV) cluster training process, which generates the set of AFV clusters comprises:
    receiving AFV cluster training data comprising a sequence of events resulting from the log messages generated by the computer system during operation of the computer system in the training phase;
    sliding markers that define a window along a time axis in the sequence of events to produce a set of contexts, wherein each context comprises a window of consecutive events in the sequence of events;
    for each event in the sequence of events, forming a context set comprising a current context, which is a first context that contains the event, and a preceding sequence of context sets;
    forming an AFV for each context set, wherein each AFV represents correlations between events that comprise each context in the context set; and
    performing a clustering operation on the AFVs to form the set of AFV clusters;
  performing anomaly detection based on the sequences of events comprises:
    converting the sequences of events into a set of AFVs, wherein each AFV represents correlations between events in a related set of contexts, wherein each context comprises a window of events; and
    mapping each AFV to an AFV cluster in a set of AFV clusters;
    wherein an anomaly is detected whenever an AFV does not map to an AFV cluster in the set of AFV clusters; and
  when an anomaly is detected, triggering an alert.

2. The method of claim 1, wherein during a preceding log-cluster training process, which generates the set of clusters of log messages, the method comprises:
  receiving training log messages generated by the computer system during operation of the computer system in a training phase;
  performing a clustering operation on the training log messages to produce the set of clusters of log messages; and
  associating an event with each cluster in the set of clusters.

3. The method of claim 2, wherein the clustering operation involves using a clustering technique, which automatically determines a number of clusters in the set of clusters.

4. The method of claim 3, wherein the clustering operation is performed using the tri-point clustering (TPC) technique.

5. The method of claim 2, wherein while performing the clustering operation, the method comprises:
  associating one or more templates with each cluster, wherein each template includes a fixed portion, comprising common substrings for log messages that map to the template, and a variable portion, comprising one or more attribute values that have been replaced with wildcard values; and
  wherein a log message is assigned to a cluster when the log message matches a template associated with the cluster.

6. The method of claim 5, wherein for each log message, the method further comprises replacing attribute values that contain personally identifiable information (PII) with wildcard values, thereby removing the PII from the log message.

7. The method of claim 1, wherein performing the clustering operation on the AFVs involves using the TPC technique to perform the clustering operation.

8. The method of claim 1, wherein a detected anomaly indicates one of the following:
  a hardware failure;
  a software failure;
  an intrusion detection;
  a malicious activity; and
  a performance issue.

9. The method of claim 1, wherein when an anomaly is detected, the method further comprises performing a remedial action, which can include one of the following:
  informing a system administrator about the anomaly and providing context information;
  scheduling execution of diagnostics and/or security scanning applications on the affected parts of the computer system;
  suspending affected users or services;
  enforcing multi-factor authentication for affected users or services;
  initiating service migration from affected parts of the system;
  taking actions to facilitate reallocation and/or rebalancing affected resources and services; and
  modifying settings of firewalls to deny or throttle traffic to affected resources or services.

10. A non-transitory, computer-readable storage medium storing instructions that when executed by a computer cause the computer to perform a method for detecting an anomaly in a computer system based on log messages, the method comprising:
  receiving log messages generated by the computer system during operation of the computer system;
  mapping each received log message to a cluster in a set of clusters of log messages, wherein each cluster is associated with a specific event;
  forming events for consecutive log messages into sequences of events;
  preceding associations feature vector (AFV) cluster training process, which generates the set of AFV clusters comprises:
    receiving AFV cluster training data comprising a sequence of events resulting from the log messages generated by the computer system during operation of the computer system in the training phase;
    sliding markers that define a window along a time axis in the sequence of events to produce a set of contexts, wherein each context comprises a window of consecutive events in the sequence of events;
    for each event in the sequence of events, forming a context set comprising a current context, which is a first context that contains the event, and a preceding sequence of context sets;
    forming an AFV for each context set, wherein each AFV represents correlations between events that comprise each context in the context set; and
    performing a clustering operation on the AFVs to form the set of AFV clusters;

performing anomaly detection based on the sequences of events comprises:
converting the sequences of events into a set of AFVs, wherein each AFV represents correlations between events in a related set of contexts, wherein each context comprises a window of events; and
mapping each AFV to an AFV cluster in a set of AFV clusters;
wherein an anomaly is detected whenever an AFV does not map to an AFV cluster in the set of AFV clusters; and
when an anomaly is detected, triggering an alert.

11. The non-transitory, computer-readable storage medium of claim 10, wherein during a preceding log-cluster training process, which generates the set of clusters of log messages, the method comprises:
receiving training log messages generated by the computer system during operation of the computer system in a training phase;
performing a clustering operation on the training log messages to produce the set of clusters of log messages; and
associating an event with each cluster in the set of clusters.

12. The non-transitory, computer-readable storage medium of claim 11, wherein the clustering operation involves using a clustering technique, which automatically determines a number of clusters in the set of clusters.

13. The non-transitory, computer-readable storage medium of claim 12, wherein the clustering operation is performed using the tri-point clustering (TPC) technique.

14. The non-transitory, computer-readable storage medium of claim 11, wherein while performing the clustering operation, the method comprises:
associating one or more templates with each cluster, wherein each template includes a fixed portion, comprising common substrings for log messages that map to the template, and a variable portion, comprising one or more attribute values that have been replaced with wildcard values; and
wherein a log message is assigned to a cluster when the log message matches a template associated with the cluster.

15. The non-transitory, computer-readable storage medium of claim 14, wherein for each log message, the method further comprises replacing attribute values that contain personally identifiable information (PII) with wildcard values, thereby removing the PII from the log message.

16. A system that detects an anomaly in a computer system based on log messages, the system comprising:
at least one processor and at least one associated memory; and an anomaly detection mechanism that executes on the at least one processor, wherein during operation, the anomaly detection mechanism:
receives log messages generated by the computer system during operation of the computer system;
maps each received log message to a cluster in a set of clusters of log messages, wherein each cluster is associated with a specific event;
forms events for consecutive log messages into sequences of events;
preceding associations feature vector (AFV) cluster training process, which generates the set of AFV clusters comprises:
receiving AFV cluster training data comprising a sequence of events resulting from the log messages generated by the computer system during operation of the computer system in the training phase;
sliding markers that define a window along a time axis in the sequence of events to produce a set of contexts, wherein each context comprises a window of consecutive events in the sequence of events;
for each event in the sequence of events, forming a context set comprising a current context, which is a first context that contains the event, and a preceding sequence of context sets;
forming an AFV for each context set, wherein each AFV represents correlations between events that comprise each context in the context set; and
performing a clustering operation on the AFVs to form the set of AFV clusters;
performing anomaly detection based on the sequences of events comprises:
converting the sequences of events into a set of AFVs, wherein each AFV represents correlations between events in a related set of contexts, wherein each context comprises a window of events; and
mapping each AFV to an AFV cluster in a set of AFV clusters;
wherein an anomaly is detected whenever an AFV does not map to an AFV cluster in the set of AFV clusters; and
triggers an alert when an anomaly is detected.

* * * * *

UNITED STATES PATENT AND TRADEMARK OFFICE
CERTIFICATE OF CORRECTION

PATENT NO. : 10,721,256 B2
APPLICATION NO. : 15/985253
DATED : July 21, 2020
INVENTOR(S) : Urmanov et al.

Page 1 of 1

It is certified that error appears in the above-identified patent and that said Letters Patent is hereby corrected as shown below:

On the Title Page

Page 2, Column 2, item [56], Line 41, delete "Indeterminancy"" and insert -- Indeterminacy" --, therefor.

Page 3, Column 1, item [56], Line 15, delete "Conferance" and insert -- Conference --, therefor.

In the Claims

In Column 14, Line 36, in Claim 16, delete "performing" and insert -- performs --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*